US012807236B2

(12) United States Patent
Lopez et al.

(10) Patent No.: US 12,807,236 B2
(45) Date of Patent: Nov. 24, 2026

(54) VEHICLE FLUID MANAGEMENT ASSEMBLY

(71) Applicant: FORD GLOBAL TECHNOLOGIES, LLC, Dearborn, MI (US)

(72) Inventors: Martin D. Lopez, Oakland, MI (US); Jaime Octavio Milla Jimenez, Metepec (MX); Noé David Zárate Albarrán, Mexico City (MX); Patrick Reed, Livonia, MI (US); Nemer Nemer, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 255 days.

(21) Appl. No.: 18/669,685

(22) Filed: May 21, 2024

(65) Prior Publication Data

US 2025/0360968 A1 Nov. 27, 2025

(51) Int. Cl.
*B62D 25/08* (2006.01)
*B62D 25/24* (2006.01)

(52) U.S. Cl.
CPC ........... *B62D 25/081* (2013.01); *B62D 25/24* (2013.01)

(58) Field of Classification Search
CPC ........ B62D 25/081; B62D 25/24; B60R 13/07
See application file for complete search history.

(56) References Cited

U.S. PATENT DOCUMENTS 4,819,550 A * 4/1989 Ioka ........................ B60H 1/28 454/147
4,886,314 A * 12/1989 Maeda ................. B62D 25/081 296/192
5,145,457 A * 9/1992 Tanigaito ............. B62D 25/081 296/192
5,669,986 A * 9/1997 Buchanan, Jr. ........... B60S 1/50 15/103
6,688,048 B2 2/2004 Staschik
6,699,086 B1 3/2004 Belter et al.
7,316,448 B2 1/2008 Koyama et al.
8,308,224 B2 * 11/2012 Ishii ..................... B62D 25/081 296/192
10,232,693 B1 * 3/2019 Williams ................. B60J 10/25
10,266,212 B2 4/2019 Overgaard et al.
11,203,382 B2 12/2021 Akizuki et al.
11,572,145 B1 2/2023 Andrasko et al.
(Continued)

FOREIGN PATENT DOCUMENTS

DE 202018101082 U1 4/2018
EP 1787869 A1 * 5/2007 ............ B60R 13/07
(Continued)

*Primary Examiner* — Jason S Morrow
(74) *Attorney, Agent, or Firm* — Vichit Chea; Carlson, Gaskey & Olds, P.C.

(57) ABSTRACT

A device may include a fluid management assembly securable to a vehicle at a first location on a rear side of a compartment of the vehicle and at a second location on a lateral side of the compartment, the fluid management assembly including a fluid collection cavity and a fluid directing channel, and when the fluid management assembly is secured to the vehicle at the first location and the second location, the fluid collection cavity at least partially disposed beneath a front cowl of the vehicle, and the fluid directing channel guides fluid in a first direction along the lateral side of the compartment.

19 Claims, 6 Drawing Sheets

(56) References Cited

U.S. PATENT DOCUMENTS

| | | | |
|---|---|---|---|
| 2011/0174706 | A1 | 7/2011 | Russell |
| 2022/0063729 | A1 | 3/2022 | Steinbrecher et al. |
| 2023/0058886 | A1 | 2/2023 | Mogi et al. |

FOREIGN PATENT DOCUMENTS

| | | | | | |
|---|---|---|---|---|---|
| EP | 1787869 | B1 | | 5/2013 | |
| GB | 2054133 | A | * | 2/1981 | ......... B60R 13/0846 |
| JP | H03125675 | A | * | 5/1991 | |
| JP | 2022159695 | A | | 10/2022 | |
| KR | 20250156973 | A | * | 11/2025 | ........... B62D 25/081 |
| WO | 2005065071 | A2 | | 7/2005 | |
| WO | 2005085045 | A1 | | 9/2005 | |
| WO | 2023172364 | A2 | | 9/2023 | |

* cited by examiner

VEHICLE FLUID MANAGEMENT ASSEMBLY

TECHNICAL FIELD

This disclosure relates generally to managing fluid and, more particularly, to managing fluid within a compartment of a vehicle.

BACKGROUND

Vehicle windshields can direct fluid (e.g., rain) downward toward a front cowl. Weather stripping and seals around the perimeter of the windshield can block fluid from entering a passenger compartment. Some fluid may travel toward a compartment of the vehicle, such as an engine compartment or frunk.

SUMMARY

In some aspects, the techniques described herein relate to a vehicle assembly, including: a fluid management assembly securable to a vehicle at a first location on a rear side of a compartment of the vehicle and at a second location on a lateral side of the compartment, the fluid management assembly including a fluid collection cavity and a fluid directing channel, and when the fluid management assembly is secured to the vehicle at the first location and the second location, the fluid collection cavity at least partially disposed beneath a front cowl of the vehicle, and the fluid directing channel guides fluid in a first direction along the lateral side of the compartment.

In some aspects, the techniques described herein relate to a vehicle assembly, further including the front cowl in a position vertically above the fluid collection cavity.

In some aspects, the techniques described herein relate to a vehicle assembly, further including a siderail of the vehicle, the siderail extending along a siderail axis, and the front cowl extends from an end portion of the siderail along a cowl axis that is transverse to the siderail axis.

In some aspects, the techniques described herein relate to a vehicle assembly, wherein at the first location, the fluid management assembly is secured to the front cowl, and at the second location, the fluid management assembly is secured to the siderail.

In some aspects, the techniques described herein relate to a vehicle assembly, wherein the fluid management assembly includes a first sidewall, a second sidewall, a floor, and a backwall, the floor and the backwall each connecting the first sidewall and the second sidewall.

In some aspects, the techniques described herein relate to a vehicle assembly, wherein the fluid management assembly includes a first attachment system including a connecting arm that extends from the floor, the connecting arm configured to secure the fluid management assembly at the first location.

In some aspects, the techniques described herein relate to a vehicle assembly, wherein when the fluid management assembly is secured to the vehicle, the connecting arm includes a first section that extends from the floor, a second section that extends from the first section over a portion of the front cowl, and a hook section that extends from the second section and projects through an aperture in the portion of the front cowl.

In some aspects, the techniques described herein relate to a vehicle assembly, wherein the fluid management assembly includes a second attachment system, the second attachment system securable at the second location through a fastener received within an aperture in one of the first and sidewalls.

In some aspects, the techniques described herein relate to a vehicle assembly, wherein the fastener is a threaded bolt from a siderail of the vehicle.

In some aspects, the techniques described herein relate to a vehicle assembly, wherein the connecting arm is a first connecting arm, the fluid management assembly includes a second attachment system including a second connecting arm that extends from one of the first and second sidewalls, the second connecting arm configured to secure the fluid management assembly at the second location.

In some aspects, the techniques described herein relate to a vehicle assembly, wherein when the fluid management assembly is secured to the vehicle, the first connecting arm includes a first section that extends from the floor, a second section that extends from the first section over a portion of the front cowl, and a hook section that extends from the second section and projects through an aperture in the portion of the front cowl.

In some aspects, the techniques described herein relate to a vehicle assembly, wherein when the fluid management assembly is secured to the vehicle, the second connecting arm includes a first section that extends from at least one of the first and second sidewalls over an upper portion of a siderail of the vehicle, a second section that extends from the first section at least partially over a side portion of the siderail, and a post section that extends from the second section and projects through an opening in the side portion of the siderail.

In some aspects, the techniques described herein relate to a vehicle assembly, wherein the compartment is an engine compartment.

In some aspects, the techniques described herein relate to a vehicle assembly method, including: receiving a flow of fluid in a fluid collection cavity of a fluid management assembly that is secured to a vehicle at a first location on a rear side of a compartment of the vehicle and at a second location on a lateral side of the compartment, the fluid collection cavity at least partially disposed beneath a front cowl of the vehicle; and directing the fluid received within the fluid collection cavity along a fluid directing channel of the fluid collection cavity in a first direction along the lateral side of the compartment.

In some aspects, the techniques described herein relate to a vehicle assembly method, wherein the fluid is directed by the fluid directing channel toward an opening facing away from components in the compartment.

In some aspects, the techniques described herein relate to a vehicle assembly method, wherein the fluid management assembly is secured to the front cowl at the first location, and at the second location, the fluid management assembly is secured to a siderail that extends along the lateral side of the compartment.

In some aspects, the techniques described herein relate to a vehicle assembly method, further including securing at the first location a first attachment system of the fluid management assembly, the first attachment system includes a first connecting arm that secures the fluid management assembly to a portion of the front cowl.

In some aspects, the techniques described herein relate to a vehicle assembly method, further including securing at the second location a second attachment system of the fluid management assembly through a fastener from a siderail of the vehicle.

In some aspects, the techniques described herein relate to a vehicle assembly method, further including securing at the second location a second attachment system of the fluid management assembly, the second attachment system includes a second connecting arm that secures the fluid management assembly to a siderail of the vehicle.

In some aspects, the techniques described herein relate to a vehicle assembly method, wherein the compartment is an engine compartment.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a fluid management assembly for managing fluid near a windshield and front cowl of a vehicle. The fluid management assembly can be used to guide fluid away from fluid-sensitive components. In an example, the fluid management assembly is secured to both a rear side of an engine compartment and a lateral side of the engine compartment. These and other features are discussed in greater detail in the following paragraphs of this detailed description.

Figure 1:
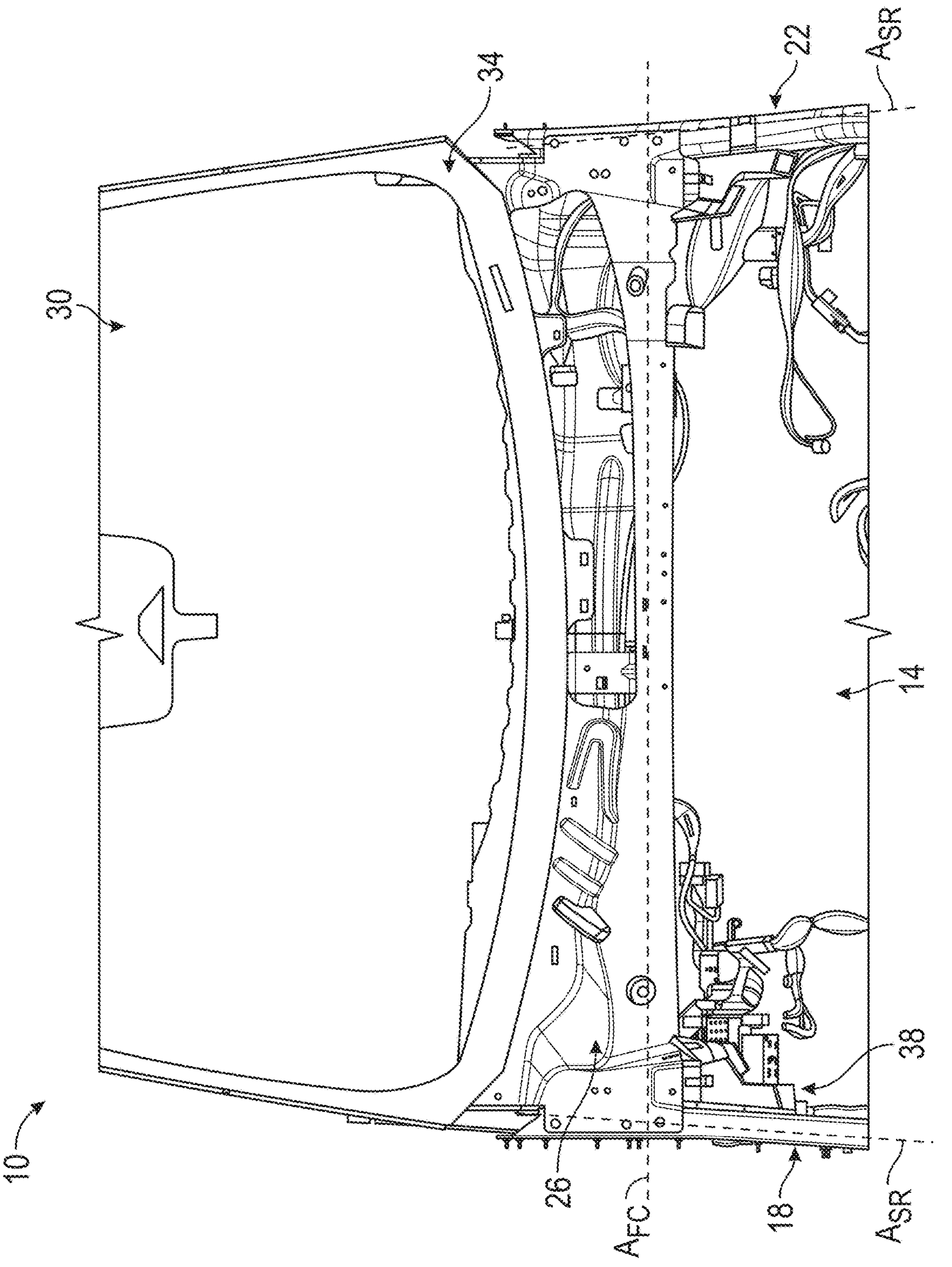
FIG. 1 schematically illustrates a top view of a portion of a vehicle with a hood removed to show an engine compartment of the vehicle.

FIG. 1 schematically illustrates select portions of a vehicle 10. Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component or system.

The vehicle 10 includes a compartment, here an engine compartment 14, that is at least partially defined by a pair of opposing and longitudinally extending first and second siderails 18, 22, and a front cowl 26. While the examples of this disclosure are described in connection with the engine compartment 14, the examples could be used in connection with other compartments, such as a frunk of an electric vehicle.

The engine compartment 14 establishes a space for housing components of the vehicle 10. The engine compartment 14 in this example, houses components of an electrical system, such as a battery, wiring harnesses, and various sensors for example.

The first siderail 18 and the second siderail 22 each extend along a respective siderail axis $A_{SR}$ and establish sides of the engine compartment 14. The first siderail 18 and the second siderail 22 generally are part of the body or frame of the vehicle 10.

The front cowl 26 extends laterally between the first siderail 18 and second siderail 22. The front cowl 26 can at least partially fill a gap between a vehicle hood (not shown) and a windshield 30. In this example, the front cowl 26 extends the along a front cowl axis $A_{FC}$ which is transverse to the siderail axis $A_{SR}$.

Sometimes, fluid can contact the windshield 30. Some of the fluid deposited on the windshield 30 tends to flow downward toward a base 34 of the windshield 30 where the windshield 30 interfaces with the front cowl 26. The front cowl 26 is this example can collect fluid from the windshield 30 and can direct the fluid toward specific discharge points on the vehicle 10. The example front cowl 26 directs the fluid laterally outward towards at least one of the first siderail 18 and the second siderail 22. As used herein, the "fluid" can include any fluid such as water, rain, windshield washer fluid, etc.

A fluid management assembly 38 is provided on the passenger and driver side of the vehicle 10 near corners where the first and second siderails 18, 22 and the front cowl 26 are secured. The fluid management assembly 38 is configured to collect and guide fluid from the front cowl 26 in a direction away from the engine compartment 14 (i.e., away from components in the engine compartment 14).

Figure 2:
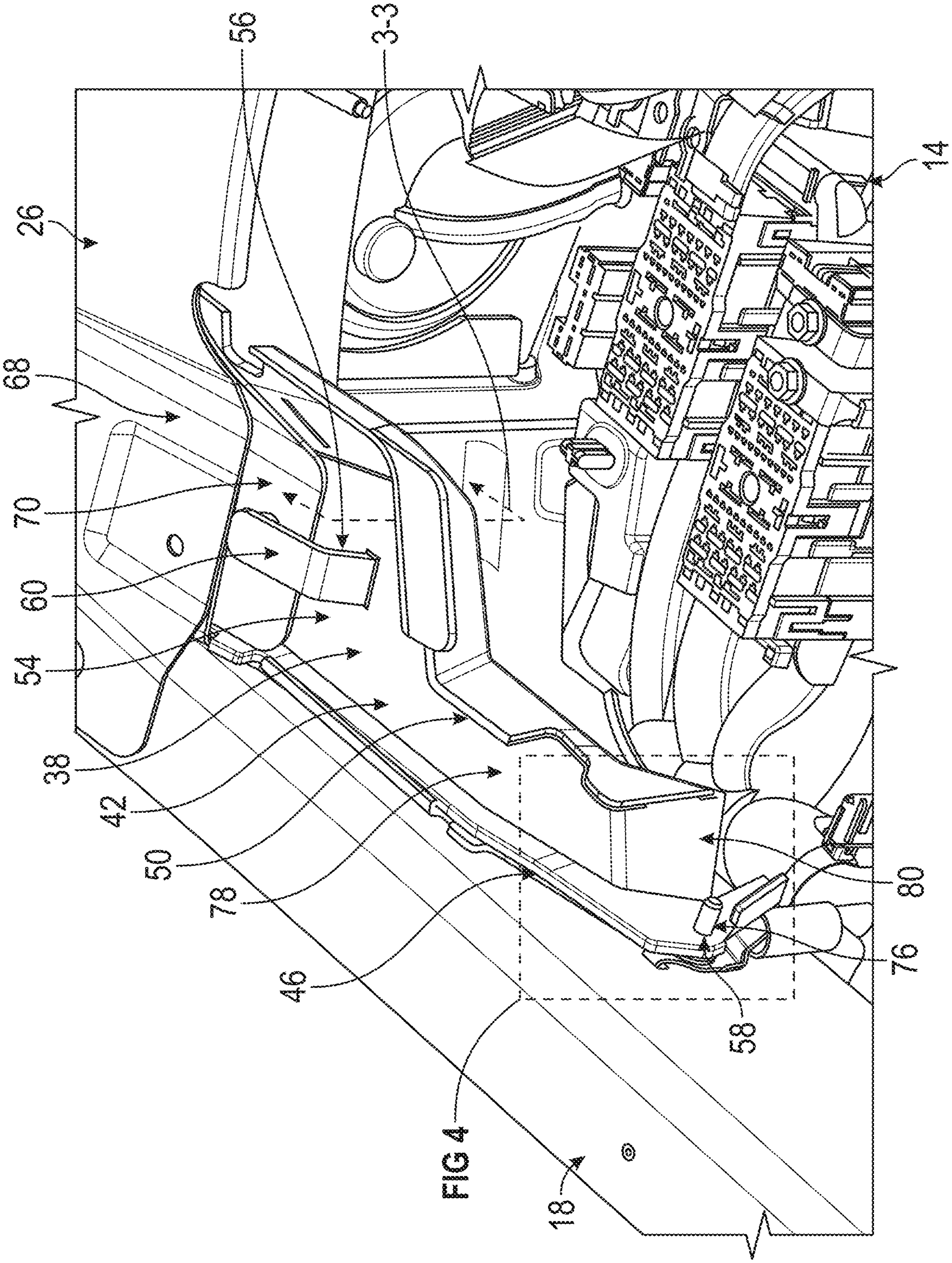
FIG. 2 illustrates a perspective view of a fluid management assembly of the vehicle according to an exemplary aspect of the present disclosure.
Figure 3:
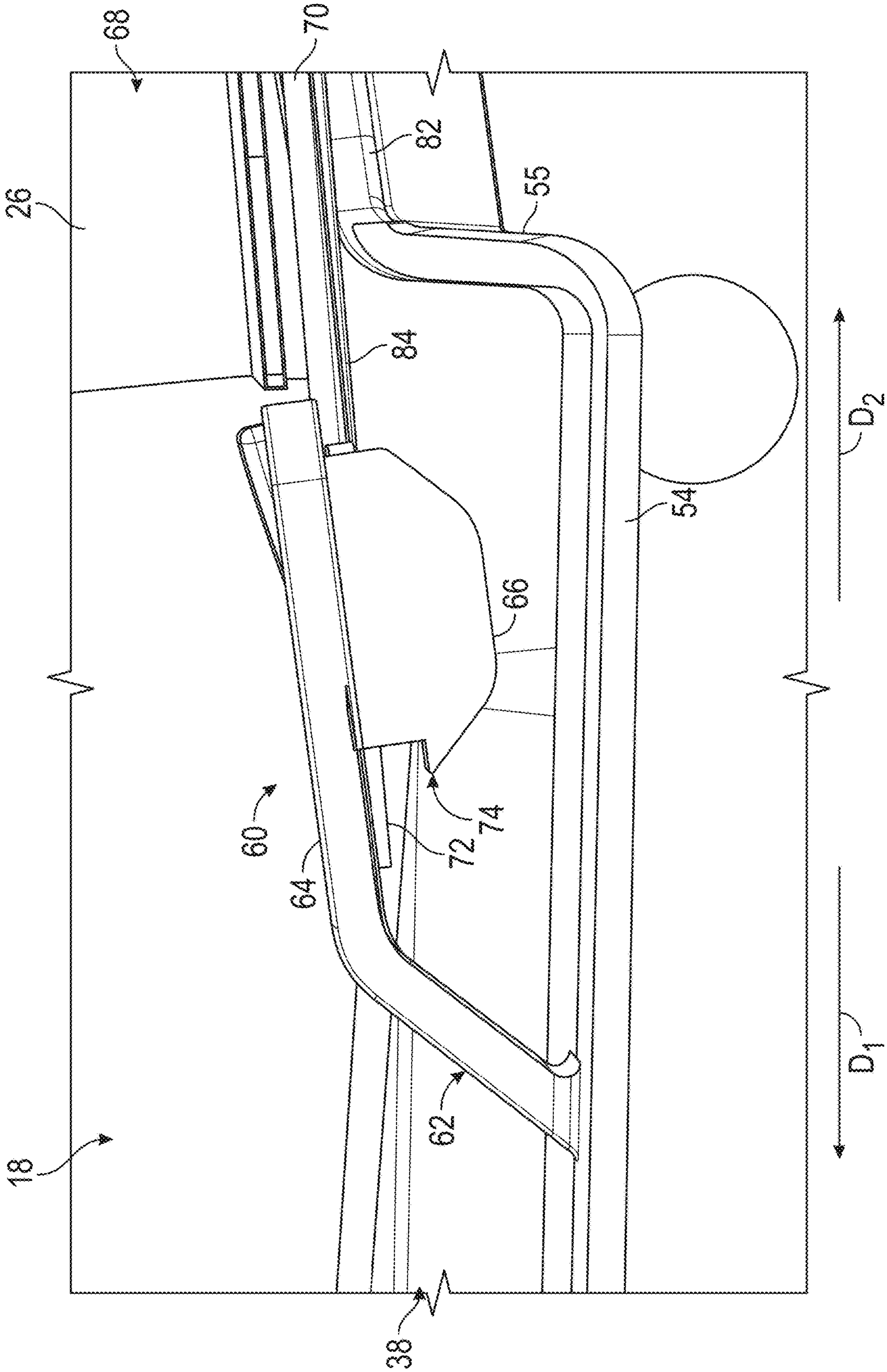
FIG. 3 is a sectional view taken at line 3-3 of FIG. 2.
Figure 4:
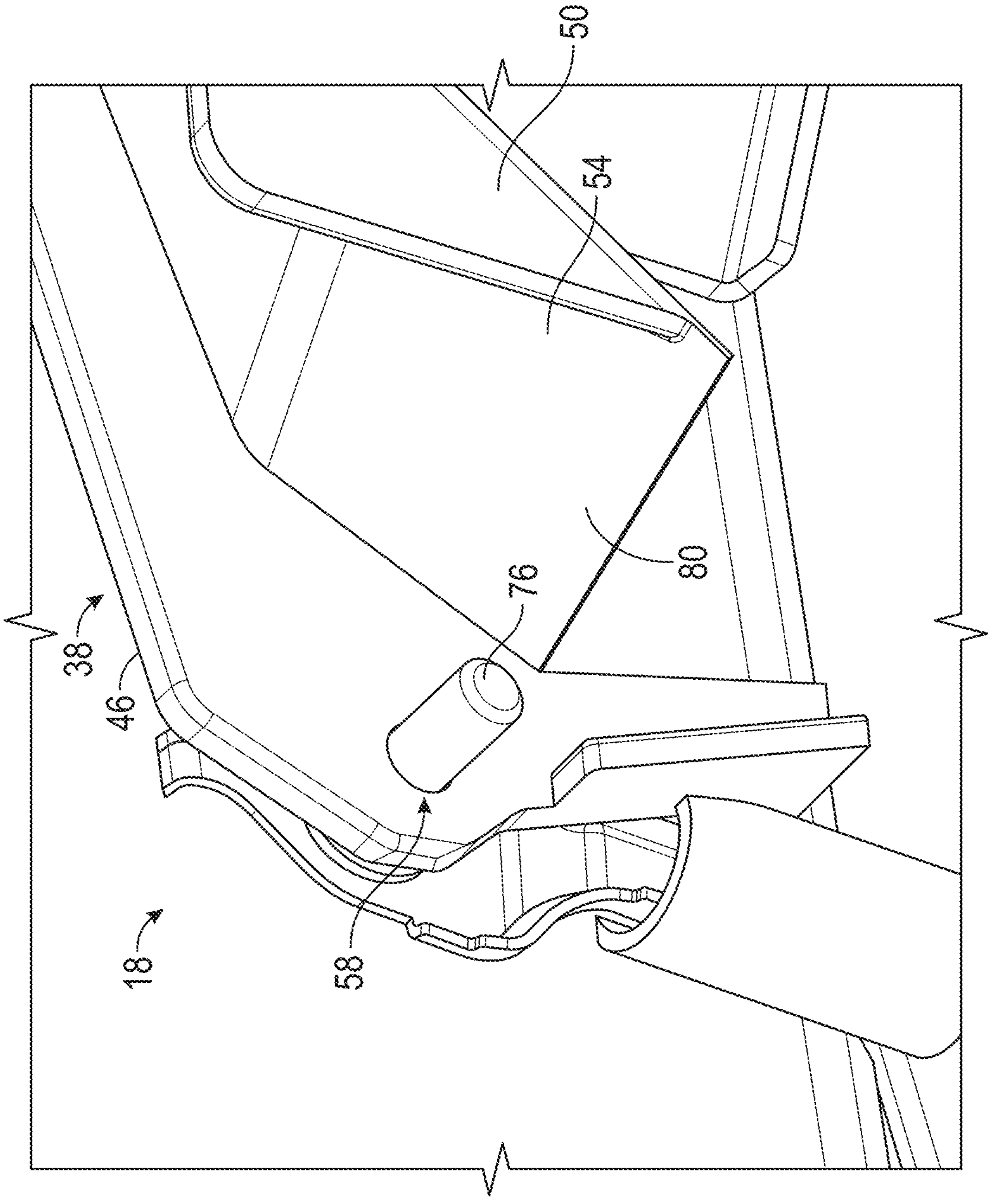
FIG. 4 is a close-up view of a portion of the fluid management assembly of FIG. 2.

Referring now to FIGS. 2-4, the fluid management assembly 38 includes a fluid collection cavity 42 that is at least partially disposed beneath the front cowl 26. That is, the front cowl 26 is vertically above the fluid collection cavity 42. In this example, the fluid collection cavity 42 is provided by a first sidewall 46, a second sidewall 50, a floor 54, and a backwall 55. The floor 54 and the backwall 55 each connect the first sidewall 46 and the second sidewall 50. The fluid management assembly 38 is located near an interface between the first siderail 18 and the front cowl 26. In one example, the first sidewall 46 abuts the first siderail 18 when the fluid management assembly 38 is secured to the vehicle 10.

The fluid management assembly 38 includes a first attachment system 56 and a second attachment system 58 for securing the fluid management system 38 to the vehicle 10. The first attachment system 56 is a rear attachment system including a connecting arm 60 for securing the fluid management assembly 38 at a first location on a rear side of the engine compartment 14. The connecting arm 60 includes a first section 62, a second section 64, and a hook section 66. The first section 62 extends from the floor 54. In one example, the first section 62 extends from the floor 54 at an angle that is less than 90 degrees. The second section 64 extends from the first section 62 at an angle and at least partially covers a portion of the front cowl 26. In one example, the second section 64 extends from the first section 62 at an angle that is greater than 90 degrees.

In the exemplary embodiment, the front cowl 26 includes a first cowl member 68 and a second cowl member 70 having an end portion 72. The second section 64 of the connecting arm 60 at least partially covers the end portion 72 when the first attachment system 56 is connected to the front cowl 26. The hook section 66 the projects through an aperture in the end portion 72 of the second cowl member 70 to secure the fluid management assembly 38 at the first location. The hook section 66 includes a notch 74 to block lateral movement of the fluid management system 38. In one example, the hook section 66 extends from the second section 64 at an angle of about 90 degrees.

The second attachment system 58 is a side attachment system for securing the fluid management assembly 38 at a second location on a lateral side of the engine compartment 14. In this example, the second attachment system 58 includes fastener 76 (e.g., a threaded bolt) from the first siderail 18 that is received in an aperture in the first sidewall 46 to secure the fluid management assembly 38 at the second location. In another example, the aperture could be in the first siderail 18.

The fluid management assembly 38 receives fluid that runs off of the front cowl 26 in the fluid collection cavity 42. The fluid management assembly 38 includes a fluid directing channel 78 that guides the fluid forward from the fluid collection cavity 42 in a first direction $D_1$ (see FIG. 3) along the lateral side of the engine compartment 14 toward an opening 80 facing away from components in the engine compartment 14.

A flange 82 extends rearward from the backwall 55 of the fluid management assembly 38. The flange 82 that abuts a lower surface 84 of the front cowl 26 (e.g., the first cowl member 68) to block fluid from flowing in an opposite second direction $D_2$ (see FIG. 3). The fluid management assembly 38 thus serves as a controlled pathway for directing fluid away from fluid-sensitive components in the engine compartment 14.

Although the illustrated example shows the water management assembly 38 on the passenger side of the vehicle 10, the water management assembly 38 could additionally or alternatively be positioned on the driver side.

In this disclosure, like reference numerals designate like elements where appropriate and reference numerals with the addition of one-hundred or multiples thereof designate modified elements that are understood to incorporate the same features and benefits of the corresponding elements.

Figure 5:
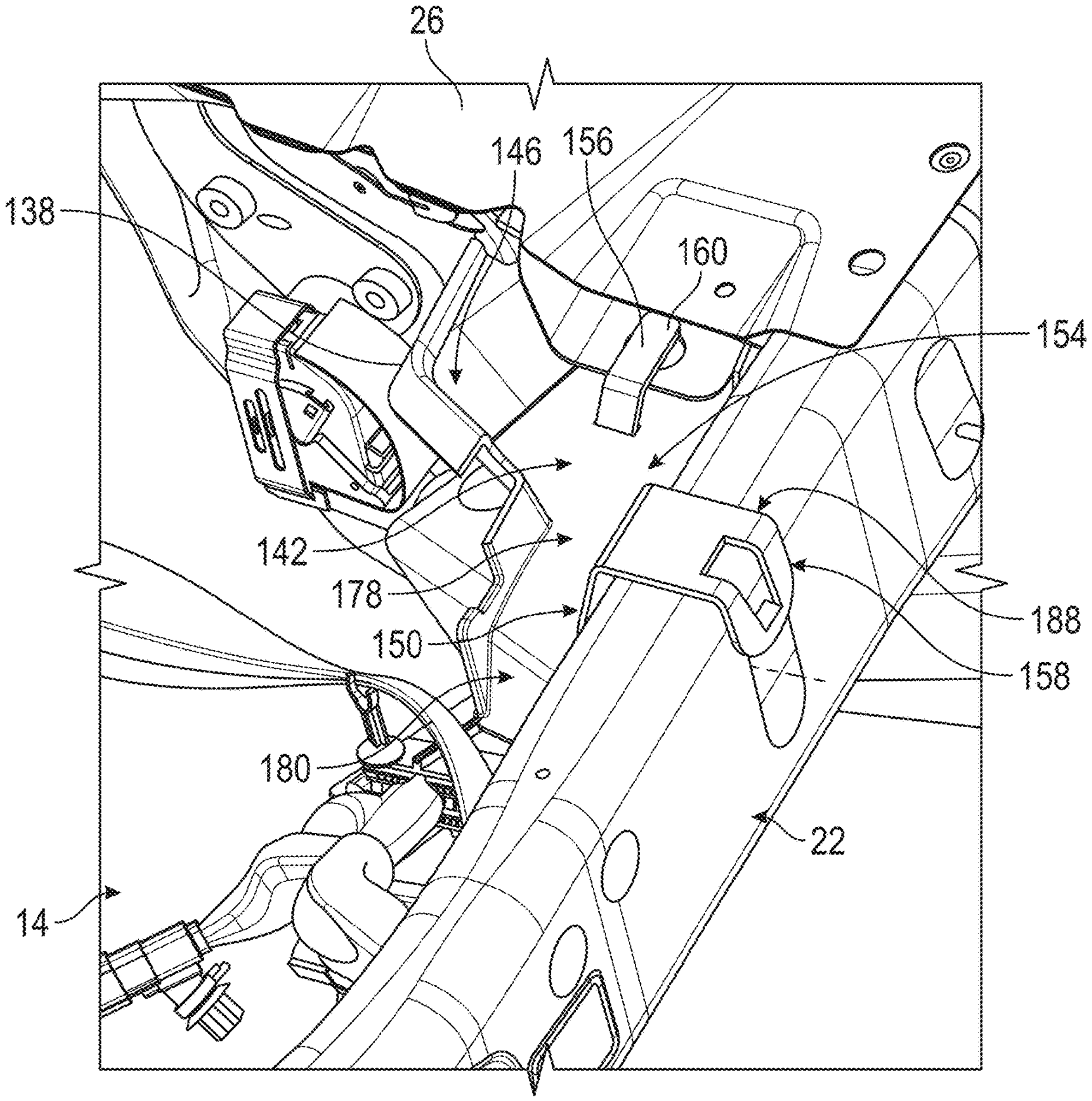
FIG. 5 illustrates a perspective view of a fluid management assembly according to another exemplary embodiment of the present disclosure.
Figure 6:
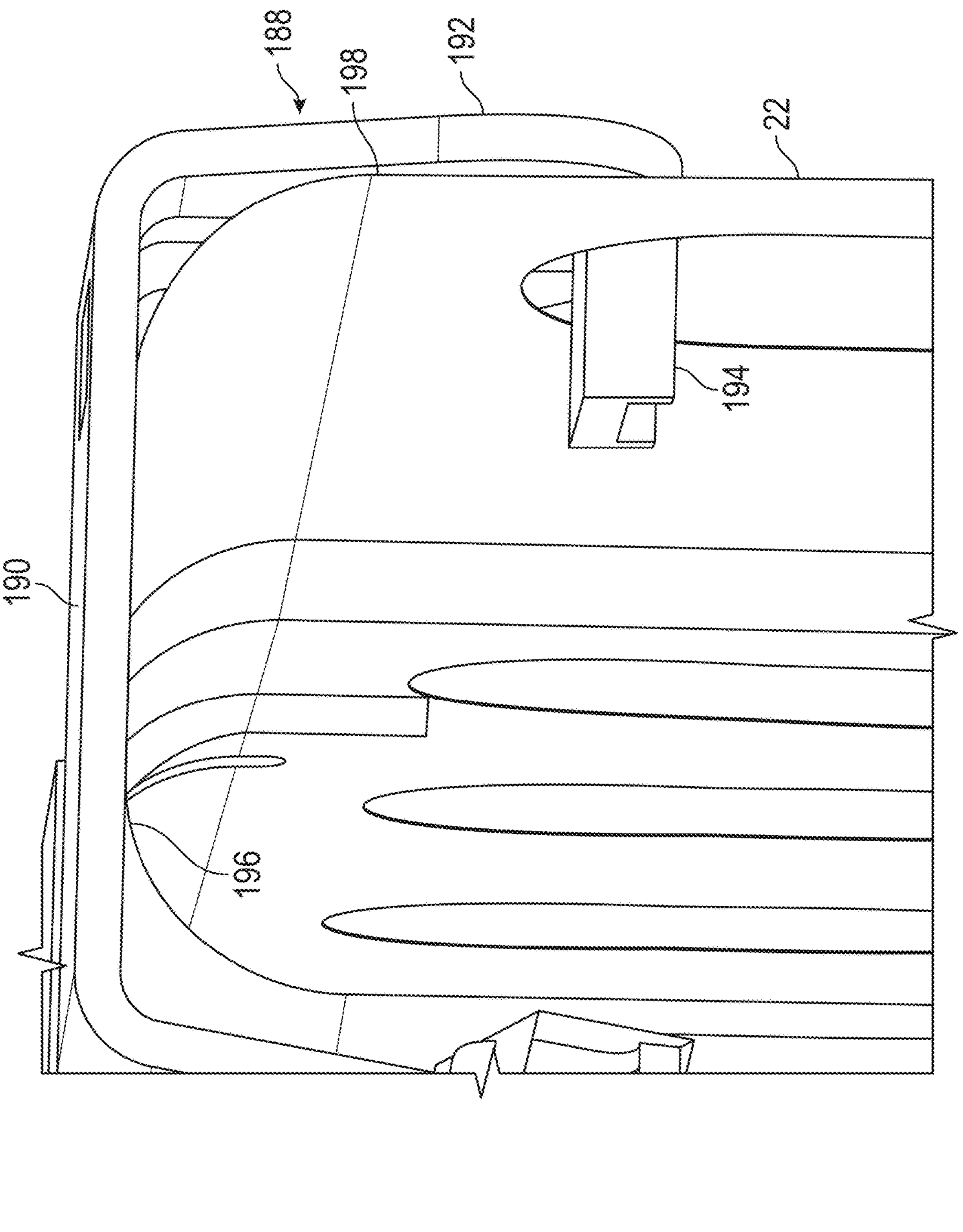
FIG. 6 is a close-up view of a portion of the fluid management assembly of FIG. 5.

FIGS. 5 and 6 illustrate a fluid management assembly 138 according to another example. The fluid management assembly 138 is located near an interface between the second siderail 22 and the front cowl 26. Like the fluid management assembly 38, the fluid management assembly 138 includes a fluid collection cavity 142 that is at least partially disposed beneath the front cowl 26. The fluid collection cavity 142 is provided by a first sidewall 146, a second sidewall 150, a floor 154, and a backwall 155. The floor 154 and the backwall 155 each connect the first sidewall 146 and the second sidewall 150.

The fluid management assembly 138 additionally includes a first attachment system 156 for securing the fluid management assembly 38 at a first location on a rear side of the engine compartment 14 and a second attachment system 158 for securing the fluid management assembly 38 at a second location on a lateral side of the engine compartment 14.

In this example, the first attachment system 156 is a rear attachment system including a first connecting arm 160 for securing the fluid management assembly 38 at the first location and the second attachment system 158 is a side attachment system including a second connecting arm 188 for securing the fluid management assembly 38 at the second location. The first connecting arm 160 is secured to the vehicle 10 in the same manner as the connecting arm 60 (i.e., the first connecting arm 160 is secured to the front cowl 26). The second connecting arm 188 includes a first section 190, a second section 192, and a post section 194. The first section 190 extends from the second sidewall 150 at an angle of about 90 degrees and at least partially covers an upper portion 196 of the second siderail 22. The second section 192 extends from the first section 190 at an angle of about 90 degrees and at least partially covers a side portion 198 of the second siderail 22. The post section 194 extends from the second section 195 at an angle of about 90 degrees and projects through an opening in the side portion 198 of the second siderail 22 to block lateral movement of the fluid management assembly 138. The fluid management assembly 138 receives fluid that runs off of the front cowl 26 in the fluid collection cavity 142. The fluid management assembly 138 includes a fluid directing channel 178 that guides the fluid forward from the fluid collection cavity 142 along the lateral side of the engine compartment 14 toward an opening 180 facing away from components in the engine compartment 14.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle assembly, comprising:

a fluid management assembly securable to a vehicle at a first location on a rear side of a compartment of the vehicle and at a second location on a lateral side of the compartment, the fluid management assembly including a fluid collection cavity and a fluid directing channel, wherein, when the fluid management assembly is secured to the vehicle at the first location and the second location, the fluid collection cavity is at least partially disposed beneath a front cowl of the vehicle, and the fluid directing channel guides fluid in a first direction along the lateral side of the compartment, wherein the fluid management assembly includes a first sidewall, a second sidewall, a floor, and a backwall, the floor and the backwall each connecting the first sidewall and the second sidewall, and wherein the fluid management assembly includes a first attachment system including a connecting arm that extends from the floor, the connecting arm configured to secure the fluid management assembly at the first location.

2. The vehicle assembly of claim 1, further comprising the front cowl in a position vertically above the fluid collection cavity.

3. The vehicle assembly of claim 2, further comprising a siderail of the vehicle, the siderail extending along a siderail axis, and the front cowl extends from an end portion of the siderail along a cowl axis that is transverse to the siderail axis.

4. The vehicle assembly of claim 3, wherein at the first location, the fluid management assembly is secured to the front cowl, and at the second location, the fluid management assembly is secured to the siderail.

5. The vehicle assembly of claim 1, wherein when the fluid management assembly is secured to the vehicle, the connecting arm includes a first section that extends from the floor, a second section that extends from the first section over a portion of the front cowl, and a hook section that extends from the second section and projects through an aperture in the portion of the front cowl.

6. The vehicle assembly of claim 1, wherein the fluid management assembly includes a second attachment system, the second attachment system securable at the second location through a fastener received within an aperture in one of the first and sidewalls.

7. The vehicle assembly of claim 6, wherein the fastener is a threaded bolt from a siderail of the vehicle.

8. The vehicle assembly of claim 1, wherein the connecting arm is a first connecting arm, the fluid management assembly includes a second attachment system including a second connecting arm that extends from one of the first and second sidewalls, the second connecting arm configured to secure the fluid management assembly at the second location.

9. The vehicle assembly of claim 8, wherein when the fluid management assembly is secured to the vehicle, the first connecting arm includes a first section that extends from the floor, a second section that extends from the first section over a portion of the front cowl, and a hook section that extends from the second section and projects through an aperture in the portion of the front cowl.

10. The vehicle assembly of claim 8, wherein when the fluid management assembly is secured to the vehicle, the second connecting arm includes a first section that extends from at least one of the first and second sidewalls over an upper portion of a siderail of the vehicle, a second section that extends from the first section at least partially over a side portion of the siderail, and a post section that extends from the second section and projects through an opening in the side portion of the siderail.

11. The vehicle assembly of claim 1, wherein the compartment is an engine compartment.

12. A vehicle assembly method, comprising:

receiving a flow of fluid in a fluid collection cavity of a fluid management assembly that is secured to a vehicle at a first location on a rear side of a compartment of the vehicle and at a second location on a lateral side of the compartment, the fluid collection cavity at least partially disposed beneath a front cowl of the vehicle; and directing the fluid received within the fluid collection cavity along a fluid directing channel of the fluid collection cavity in a first direction along the lateral side of the compartment, wherein the fluid management assembly includes a first sidewall, a second sidewall, a floor, and a backwall, the floor and the backwall each connecting the first sidewall and the second sidewall, and wherein the fluid management assembly includes a first attachment system including a connecting arm that extends from the floor, wherein the connecting arm secures the fluid management assembly at the first location.

13. The vehicle assembly method of claim 12, wherein the fluid is directed by the fluid directing channel toward an opening facing away from components in the compartment.

14. The vehicle assembly method of claim 12, wherein the fluid management assembly is secured to the front cowl at the first location, and at the second location, the fluid management assembly is secured to a siderail that extends along the lateral side of the compartment.

15. The vehicle assembly method of claim 12, wherein the connecting arm secures the fluid management assembly to a portion of the front cowl.

16. The vehicle assembly method of claim 15, wherein the fluid management assembly includes a second attachment system that secures the fluid management assembly at the second location through a fastener received from a siderail of the vehicle.

17. The vehicle assembly method of claim 15, wherein the connecting arm is a first connecting arm, and the fluid management assembly includes a second attachment system including a second connecting arm that secures the fluid management assembly at the second location to a siderail of the vehicle.

18. The vehicle assembly method of claim 12, wherein the compartment is an engine compartment.

19. A vehicle assembly, comprising:

a fluid management assembly securable to a vehicle at a first location on a rear side of a compartment of the vehicle and at a second location on a lateral side of the compartment, the fluid management assembly including a fluid collection cavity and a fluid directing channel, wherein, when the fluid management assembly is secured to the vehicle at the first location and the second location, the fluid collection cavity is at least partially disposed beneath a front cowl of the vehicle, and the fluid directing channel guides fluid in a first direction along the lateral side of the compartment, wherein the fluid management assembly includes a first sidewall, a second sidewall, a floor, and a backwall, the floor and the backwall each connecting the first sidewall and the second sidewall, wherein the fluid management assembly includes a flange extending from the backwall, the flange configured to abut a lower surface of the front cowl to block fluid from flowing in an opposite second direction.

* * * * *